Patented Sept. 21, 1948

2,449,775

UNITED STATES PATENT OFFICE 2,449,775

CATALYTIC SYNTHESIS OF HYDROCARBONS

Wealtha Eloise Hendriksen, New York, N. Y., assignor to Hydrocarbon Research, Inc., New York, N. Y., a corporation of New Jersey No Drawing. Application August 24, 1946, Serial No. 692,938

9 Claims. (Cl. 260—449.6)

1

The present invention relates to the synthesis of hydrocarbons and oxygenated compounds by the catalytic reduction of carbon oxides with hydrogen.

It has been known for some time that in the presence of suitable catalysts, carbon monoxide, for example, reacts with hydrogen with the direct production of hydrocarbons. The character of the hydrocarbon product depends on factors such as the reaction temperature and pressure, the conditions of contact and the specific catalyst employed.

The catalysts commonly used for this purpose are metals of the iron group, as for example iron, cobalt, nickel and ruthenium. Iron constitutes an attractive material for this purpose, particularly for economic reasons. The use of iron, however, has some characteristic limitations, including a tendency to form by-product carbon dioxide instead of water vapor, with a resulting uneconomic utilization of carbon fed to the system. This tendency is attributed to the presence of iron oxide which appears to be formed in the catalyst in the course of the synthesis reaction. This disadvantage may characterize other catalyst to a relatively more limited degree. Moreover, the catalyst, particularly when operating at the higher temperature ranges, becomes adversely affected by reaction conditions with formation of carbonaceous deposits, and a progressive disintegration and deterioration. It has heretofore been necessary in all practical operations to regenerate the catalyst periodically, but the regeneration, with hydrogen, for example, appears to involve alteration of the catalyst, particularly, reduction of the desirable catalytic metal carbide to metal.

It is an object of the present invention to provide a catalyst for the foregoing reaction which overcomes the foregoing difficulties and promotes the reduction of the carbon oxides by hydrogen, and the resulting formation of hydrocarbons in good yields approximating optimum. A further object of the present invention contemplates the provision of a catalyst as above, which is characterized by a pronounced tendency for the synthesis of hydrocarbon products particularly suited as motor fuels because of good antiknock properties. A yet further object of the present invention contemplates a process as above, wherein the

2 formation of by-product carbon dioxide is materially restricted, particularly in the case of iron catalyst, with the production, in lieu thereof, of by-product water vapor. Still another object is to provide synthesis catalysts in highly carbided form which show improved resistance to change during use and, accordingly, exert high activity over prolonged periods of operation. Other and further objects will be apparent from a consideration of the following disclosure.

In accordance with the present invention, the synthesis of hydrocarbons and oxygenated compounds is carried out by treating synthesis gas comprising essentially a carbon oxide and hydrogen at an elevated temperature, and advantageously an elevated pressure, with a metallic catalyst of the iron group with which tellurium is combined as an alloying agent. In its preferred aspect, the invention contemplates use of a catalyst which is essentially an alloy of iron and tellurium.

In the course of the reaction, the catalyst is probably altered by the carbiding reaction so that the catalyst is essentially a mixture of the catalyst metal and its carbided equivalent. In referring to a metallic alloy catalyst I include homogeneous metallic composition of the character produced by dissolving or otherwise homogeneously distributing the tellurium in molten metallic iron, as well as such other physical and chemical conditions as may result through the action of the synthesis gas on such a catalyst in the course of the catalytic synthesis of hydrocarbons or oxygenated compounds. The invention also contemplates an alloy catalyst as above, wherein carbon forms one of the alloying elements, either as the result of inclusion in the original melt, or as the result of later carbiding treating with a gaseous or solid carbiding agent, or as the result of the action of synthesis gas in the hydrocarbon forming reaction.

In the preparation of the catalyst, metallic alloys of iron and tellurium may be finely ground, abraded, broken or machined into suitable particles or other desired shapes. The use of a particulate mass of catalyst follows the conventional procedure in the art for the purpose of presenting extensive catalytic surface to the reactants. It, therefore, is advantageous in most instances to employ particles of relatively limited size. The actual size of the particles may vary from particles as large as 1/16 of an inch or greater, down to as fine or impalpable a powder as may be desired.

With reference to particle size, it should be noted the invention is applicable to any of the conventional types of contact technique with which I am familiar, as for example fixed bed type of operation or fluidization. According to the fixed bed operation, particle size may vary, without critical limit, depending on the preference of the operator. Following the fluidization technique, on the other hand, it is necessary to employ powder, as is known, of such limited particle size that it can be readily aerated in the available upflow of gas. In the powdered state, the catalyst may be readily handled either mechanically or otherwise in accordance with any conventional procedure.

The relative proportion of the alloying elements is similarly variable within an extremely wide range. Surprisingly, proportions of tellurium to iron which in many alloys will be considered to be mere traces, are noticeably effective. A material improvement in results occurs with iron alloys containing as little as 0.005% by weight tellurium, although advantageously greater proportions, as for example, above 0.05% are to be preferred. There appears to be no practical upper limit to this range as long as the iron is present in major proportion. On the other hand, the economic limitations and the fact that all the important advantages are present at lower concentrations make it advisable to operate with compositions containing percentages of tellurium below 2% by weight, preferably below about 1%. In short, the present improved results are obtainable in full measure at low alloy concentrations of tellurium so that resort to the higher alloying proportions is unnecessary.

As indicated above, the catalyst may be prepared simply by comminuting or subdividing any previously prepared alloy composition. With many low tellurium-iron alloys this can be accomplished by any conventional means such as grinding, abrading or machining. It is important to note, however, that with alloys containing a relatively high carbon content, particularly in the case of cast irons containing tellurium, there is a definite tendency to the formation of chilled or white iron extremely hard in composition, and therefore unsuitable for comminution by many conventional means. It is usually, therefore, advisable to start with a relatively soft alloy composition preferably of low carbon content, in order to simplify the particle forming steps. On the other hand, a relatively large carbon content may not be objectionable if chilling is avoided during preparation of the alloy. Where low carbon or carbon free alloys are comminuted, the powder may thereafter be subjected by carbiding in any conventional manner, as by treatment with carbon monoxide at elevated temperatures in order to incorporate iron carbide either at the surface or entirely throughout the body of each particle.

It is well to note that the improved effect of the present alloy may be impaired to some extent by the substantial presence of graphitizing alloying metals within the final catalyst. These, for example, include copper, aluminum, calcium, titanium, zirconium, barium and the like. Where graphitizing agents are present in moderate proportions, a somewhat slightly increased proportion of tellurium may advantageously be used in alloys of this character in order to secure an effect comparable to the use of tellurium in iron alloys free from such agents.

In accordance with one specific embodiment of the present invention, a substantially pure iron is alloyed with about 0.2% by weight of tellurium and the product ground to a powder passing a 200 mesh screen, about 65% passing a 325 mesh screen. About 1% by weight of potassium oxide and 1% of alumina are chemically precipitated upon the powder and the resulting mass carefully dried. The powder is charged into a reaction vessel and subjected for 48 hours to the passage of synthesis gas containing approximately 31% carbon monoxide, 62% hydrogen, 4% methane, 2% carbon dioxide and the rest largely nitrogen. The temperature is maintained at a substantially uniform value of 625° F. throughout the catalytic mass, and the vessel is operated under an internal pressure of 200 pounds per square inch gauge.

The foregoing temperature is controlled in a conventional manner by the combination of internal heat exchange means and uniform fluidization of the catalyst by the upflowing reactants. The heat exchange means comprises a tubular heat exchanger of streamlined form maintained at a carefully controlled predetermined surface temperature and immersed in the catalyst mass.

A good state of dense phase fluidization is maintained as indicated above by the incoming reactant feed gases introduced at a linear velocity of about 1.5 feet per second, measured at the temperature and pressure conditions prevailing in the reactor. In other words, the gases flow upwardly through the powdered catalyst at a uniform rate throughout the horizontal cross-section of the reactor at such a rate that the individual particles are buoyed up or suspended for random movement in the powdered mass. The powder thus, as is known, assumes an aerated condition analogous to a mass of boiling liquid having an upper pseudo-liquid level and characterized by a condition of heat uniformity and thermal transfer comparable to that of a liquid of extremely good thermal properties. Under such a condition, the surface temperature of the heat exchanger is adjusted by experiment to a value where the powdered mass of catalyst is maintained throughout at a temperature within ±5° F. of the desired temperature of 625° F.

After an initial conditioning period of 48 hours, the catalyst assumes a condition of settled operation, and thereafter introduction of the feed gas is continued under the conditions previously observed. Contact time is held at 10 seconds. The product gases are collected and passed through a condenser operating at 70° F. A separation is made between a resulting water layer, a hydrocarbon layer and a normally gaseous fraction.

The hydrocarbon layer consists essentially of hydrocarbons boiling in the gasoline range in a yield equal to somewhat over 65% on the basis of the carbon monoxide converted in the reactor. The normally gaseous fraction consists essentially of carbon dioxide, normally gaseous hydrocarbons, hydrogen and a small amount of unreacted carbon monoxide. The total amount of moisture condensed over any selected period of operation is substantially greater on a molar basis than the amount of carbon dioxide in the gaseous products recovered, usually amounting to at least 3 molar parts for each molar part of carbon dioxide.

While the foregoing example concerns operation under fluidized conditions the invention is equally operative and advantageous with conventional fixed bed reactors, associated with any conventional means for maintaining desirable temperature control and uniformity.

The invention moreover, while particularly beneficial in the case of iron catalysts, is also applicable to processes of the present class employing other catalytic metals of the iron group. Thus, in place of the iron alloy in the previous example, a cobalt-tellurium alloy of substantially the same relative proportions may be employed, preferably with alteration of temperatures and pressures to those conventional with a cobalt catalyst.

From the foregoing example, it will be moreover apparent that the invention contemplates inclusion of all known activators and promoters which commonly find use in the present synthesis reaction. More specifically these, as is known, usually involve compounds or oxides of the alkali metals or alkaline earth metals, such as potassium, sodium and calcium oxides. Of the wide field of other known promoters, there may be mentioned thoria, titania, zirconia, alumina and magnesia.

It is to be understood that the reaction conditions, particularly the temperature and pressure to be observed in practicing the present invention, are generally equivalent to those heretofore observed in the art on the basis of the process employed, and particularly the metal selected as catalyst. In other words, as is known, the temperature in the case of an iron catalyst is normally in the neighborhood of 600° F., where predominantly motor gasoline fractions are desired. This temperature is varied upwardly for the production of lighter hydrocarbons, and downwardly where somewhat heavier fractions are required. Obviously where oxygenated hydrocarbon products are desired the reaction conditions are altered to the conventional ranges for the type of catalyst in question. Thus the invention contemplates the synthesis of hydrocarbons, oxygenated hydrocarbons or mixtures thereof.

Referring to the foregoing specific example using an iron-tellurium catalyst, similar results are obtained with an iron-tellurium catalyst prepared from an alloy containing 0.2% by weight tellurium and about 2% by weight carbon cast under conditions of slow cooling, the conditions of operation being otherwise identical. So also some improvement in yield is obtained when that example is modified by precarbiding the catalyst disclosed, subsequent to comminution, by contact with carbon monoxide for two hours at a temperature of 1000° F. Moreover highly carbided surfaces produced by this or any other equivalent carbiding process are advantageous not only in connection with iron catalysts but also in the case of tellurium-containing cobalt or nickel catalysts or any other catalysts of the iron group familiar in connection with hydrocarbon synthesis. In fact the conditioning treatment referred to above presumably, among other things, effects the creation of at least a layer of carbide at or in the vicinity of the active surfaces of the catalyst.

Proceeding in accordance with the present invention, it is notable that the catalyst remains cleaner and maintains high activity much longer than where tellurium is absent. In several instances it has been observed that conventional catalysts for the synthesis of hydrocarbons, when used in a fluidized reaction system, gradually become lighter so that in the course of the operation it becomes impossible to maintain dense-phase fluidization without materially decreasing the velocity of the gases through the fluidized mass. This loss of density in the catalyst particles appears to be a function of the formation of carbon within the particles; on occasion, the catalyst particles will disintegrate into smaller fragments, perhaps, because of this internal carbon formation. Catalysts containing tellurium exhibit greater stability and resistance to chemical and physical changes, and therefore are particularly well suited for use in fluidized systems wherein it is desired to maintain a condition of dense-phase fluidization over prolonged periods of operation.

Many other specific modifications and adaptations of the present invention will be obvious to those skilled in the art from a consideration of the foregoing more or less exemplary disclosure, and it is therefore understood the invention is not limited to any such details except as defined by the following claims.

I claim:

1. The process for the catalytic synthesis of compounds of the class consisting of hydrocarbons and oxygenated hydrocarbons by the reduction of a carbon oxide with hydrogen, which comprises passing synthesis gas containing essentially carbon oxide and hydrogen, under reaction conditions, in contact with a catalyst mass containing a metal of the iron group containing a minor proportion of tellurium intimately associated with said metal.

2. The process for the catalytic synthesis of compounds of the class consisting of hydrocarbons and oxygenated hydrocarbons by the reduction of a carbon oxide with hydrogen, which comprises passing synthesis gas containing essentially carbon oxide and hydrogen, under reaction conditions, in contact with a catalyst mass containing a metal of the iron group having a minor proportion of tellurium alloyed therewith.

3. The process for the catalytic synthesis of compounds of the class consisting of hydrocarbons and oxygenated hydrocarbons by the reduction of a carbon oxide with hydrogen, which comprises passing synthesis gas containing essentially carbon oxide and hydrogen, under reaction conditions, in contact with a catalyst mass containing a metal of the iron group having a minor proportion, greater than 0.005% by weight, of tellurium alloyed therewith.

4. The process for the catalytic synthesis of compounds of the class consisting of hydrocarbons and oxygenated hydrocarbons by the reduction of a carbon oxide with hydrogen, which comprises passing synthesis gas containing essentially carbon oxide and hydrogen, under reaction conditions, in contact with a catalyst mass containing an alloy of tellurium and a metal of the iron group in which tellurium is present in a minor proportion above 0.005% by weight but less than about 2% by weight.

5. In the process for catalytically synthesizing compounds of the class consisting of hydrocarbons and oxygenated hydrocarbons by the reduction of carbon monoxide with hydrogen the steps which comprise contacting synthesis gas comprising essentially carbon monoxide and hydrogen, at reaction conditions including an elevated temperature and pressure, with an iron catalyst containing from about 0.005% to 2% by weight tellurium as an alloy constituent.

6. The process as defined in claim 5 wherein the iron in said catalyst is at least partly in the form of iron carbide.

7. In the process for catalytically synthesizing compounds of the class consisting of hydrocarbons and oxygenated hydrocarbons by the reduction of carbon monoxide with hydrogen the steps which comprise contacting synthesis gas comprising essentially carbon monoxide and hydrogen, at reaction conditions including an elevated temperature and pressure, with an iron catalyst containing a minor proportion of tellurium alloyed therewith.

8. The process defined in claim 4 wherein the metal of the iron group is at least partly in the form of a carbide.

9. The process as defined in claim 7 wherein the iron in said catalyst is at least partly in the form of iron carbide.

W. ELOISE HENDRIKSEN.

REFERENCES CITED

The following references are of record in the file of this patent:

UNITED STATES PATENTS

| Number | Name | Date |
| --- | --- | --- |
| 1,721,523 | Midgley, Jr. | July 23, 1929 |
| 1,917,323 | Pier | July 11, 1933 |
| 2,131,089 | Beeck et al. | Sept. 27, 1938 |
| 2,257,082 | Yarnall | Sept. 23, 1941 |